(12) United States Patent
Lin

(10) Patent No.: US 8,912,482 B2
(45) Date of Patent: Dec. 16, 2014

(54) POSITION DETERMINING DEVICE AND METHOD FOR OBJECTS ON A TOUCH DEVICE HAVING A STRIPPED L-SHAPED REFLECTING MIRROR AND A STRIPPED RETROREFLECTOR

(71) Applicant: Chih-Hsiung Lin, New Taipei (TW)

(72) Inventor: Chih-Hsiung Lin, New Taipei (TW)

(73) Assignee: Era Optoelectronics Inc., New Taipei (TW)

( * ) Notice: Subject to any disclaimer, the term of this patent is extended or adjusted under 35 U.S.C. 154(b) by 208 days.

(21) Appl. No.: 13/651,677

(22) Filed: Oct. 15, 2012

(65) Prior Publication Data

US 2013/0099092 A1    Apr. 25, 2013

(30) Foreign Application Priority Data

Oct. 21, 2011    (TW) .............................. 100138408 A

(51) Int. Cl.
*H01J 40/14*    (2006.01)
*G06F 3/042*    (2006.01)

(52) U.S. Cl.
CPC ............ *G06F 3/0421* (2013.01); *G06F 3/0423* (2013.01)

USPC .......................................... 250/221; 250/216

(58) Field of Classification Search
USPC ................. 250/221, 216, 239, 222.1, 559.12; 345/156–158, 166–175; 356/621
See application file for complete search history.

(56) References Cited

U.S. PATENT DOCUMENTS 4,762,990 A * 8/1988 Caswell et al. ................ 250/221
4,980,547 A * 12/1990 Griffin .......................... 250/221

* cited by examiner

*Primary Examiner* — Que T Le

(57) ABSTRACT

A method for determining the position of an object, includes: respectively detecting a light beam of a light emitting module emitted from a reference point and respectively reflected and retro-reflected by a stripped L-shaped reflecting mirror and retroreflector to obtain a first signal and a second signal; processing the first signal and the second signal to obtain a plurality of included angles A1 and a plurality of included angles A2 formed by respectively intercepting the light beam emitted from the reference point and blocked directly or indirectly by the object with the first reflecting unit and second unit; and respectively combining the plurality of included angles A1 with each included angle A2, respectively converting the combinations to obtain a plurality of coordinates, and selecting at least two coordinates with the same value among the plurality of coordinates, thereby confirming a relative coordinate of the objects on a work area.

16 Claims, 5 Drawing Sheets

POSITION DETERMINING DEVICE AND METHOD FOR OBJECTS ON A TOUCH DEVICE HAVING A STRIPPED L-SHAPED REFLECTING MIRROR AND A STRIPPED RETROREFLECTOR

CLAIMS OF PRIORITY

This application claims priority to an application entitled "DEVICE AND METHOD FOR DETERMINING POSITION OF OBJECT" filed in the Taiwan Intellectual Property Office on Oct. 21, 2011 and assigned Ser. No. 100138408, the contents of which are incorporated herein by reference.

BACKGROUND OF THE INVENTION

1. Field of the Invention

The present invention relates to a device and method for determining the position of an object, and more particularly to a device and method for determining a touch position used in a touch control device.

2. Description of Related Art

The coordinate of an object is detected in a certain touch control device to use as the input information of a character, pattern or symbol corresponding to it, or the input information of an interactive electric game machine.

U.S. Pat. No. 4,762,990 discloses a data processing input interface determining the position of an object, comprising an object located in a work area surrounded by reflecting members located at peripheral borders, a source of a scanning light beam for scanning the beam across the work area from an initial start position, means for determining the position of the object within said work area by measurement of the rotational arc of the scan of a single light beam from the initial start position to rotational angles represented by serially occurring signals produced by the beam striking the object after reflection from the reflecting member located at a peripheral border and directly striking the object.

Taiwan Publishing Patent No. 201104533 discloses a multi-touch input apparatus, including a touch panel for inputting at least one touch point, at least one light source surrounding the touch panel to provides detecting light, and a plurality of imaging systems positioned on the adjacent corners of the touch panel to detect the shielding light angle of the touch point, where the plurality of imaging systems have a first visual angle and a second visual angle. The multi-touch input apparatus uses the shielding light angle of the touch point detected by different visual angles of the imaging systems to determine the touch points corresponding to the shielding light angle, and calculates by trigonometric formula to get the coordinates of the touch points.

But, an object is blocked by another object when the two objects and a scanning light beam are on the same line, the technologies of the Taiwan patent and the U.S. Patent mentioned above are unable to be used to detect the coordinate of the blocked object.

SUMMARY OF THE INVENTION

To improve the conventional technology of the position determination of an object, the present invention is proposed.

The main object of the present invention is to provide a device and method for determining the position of an objects, adapted to detect the coordinate of an object located in a work area, which is surrounded by a stripped L-shaped mixed-type reflecting unit, and stripped first and second reflecting units, where the mixed-type reflecting unit includes a reflecting mirror and a retroreflector; a light detecting unit is respectively used to detect light beams of a light-emitting module emitted from a reference point and respectively reflected by the reflecting mirror and retro-reflected by the retroreflector to obtain a first signal and second signal, where the first signal includes a plurality of first weak signals corresponding to a body, and the second signal includes at least one second weak signal corresponding to the object; a signal processing unit is used to process the first signal and the second signal to obtain a plurality of included angles A1 corresponding to the plurality of first weak signals and a plurality of included angles A2 corresponding to the plurality of second weak angles respectively between the light beams emitted from the reference point and blocked directly or indirectly by the object and the first reflecting unit and between it and the second reflecting unit; a microprocessor converts the plurality of included angles A1 respectively combined with each included angle A2 to obtain a plurality of coordinates; the plurality of coordinates are then compared with one another, and at least two coordinates with the same value are selected among the plurality of coordinates to affirm a relative coordinate of the object on the work area. As a result, the coordinate of the object located farther away from the reference point can be determined even if the object located farther away from the reference point is block by the object located nearer to the reference point.

Another object of the present invention is to provide a device and method for determining the position of an object, capable of determining the positions of a plurality of objects simultaneously, thereby processing multi-touch conveniently.

BRIEF DESCRIPTION OF THE DRAWINGS

The present invention can be more fully understood by reference to the following description and accompanying drawings, in which.

DETAILED DESCRIPTION OF THE PREFERRED EMBODIMENTS

Figure 1:
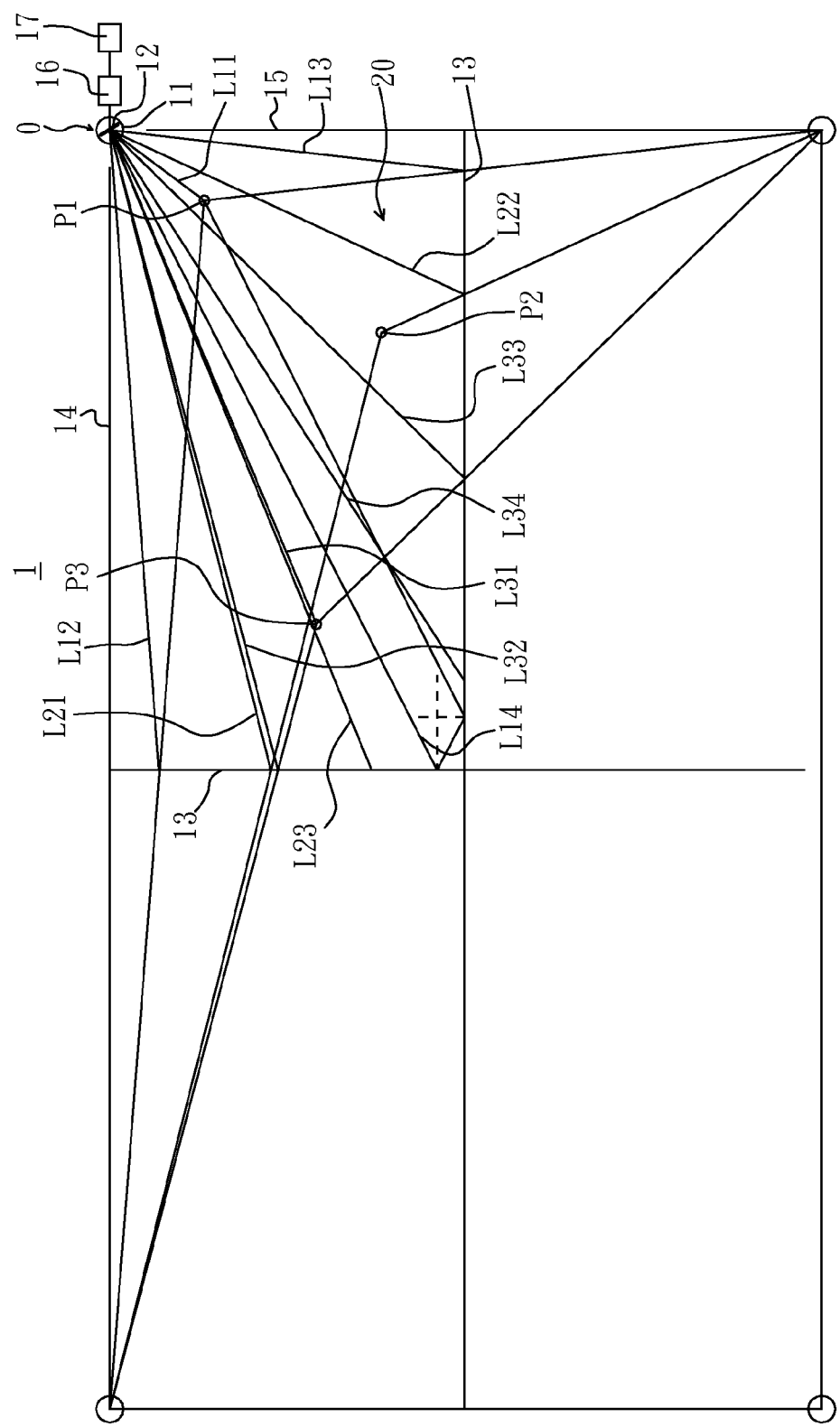
FIG. 1 is a schematic view of an object position determining device of a first preferred embodiment according to the present invention.

Referring to FIG. 1, an object position determining device 1 of a first preferred embodiment according to the present invention includes a light emitting module 11, a light detecting unit 12, a mixed-type reflecting unit 13, a first reflecting unit 14, a second reflecting unit 15, a signal processing unit 16 and a microprocessor 17.

Figure 5:
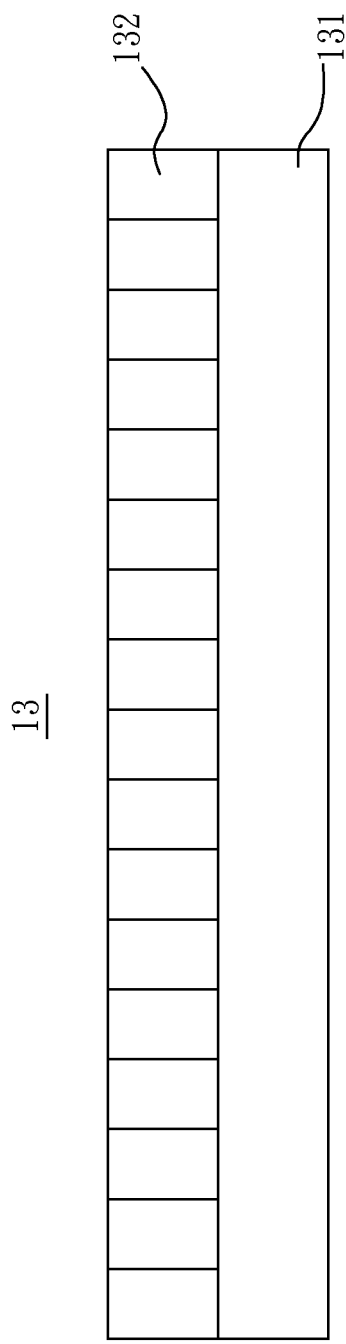
FIG. 5 is a schematic view of a mixed-type reflecting unit according to the present invention.

The light emitting module 11 of the present embodiment includes a LED light source or laser light source, and the light detecting unit 12 is a camera. The mixed-type reflecting unit 13 includes a stripped L-shaped reflecting mirror 131 and a stripped retroreflector 132; the retroreflector 132 is positioned above the reflecting mirror 131 as FIG. 5 shows, where the retroreflector 132 can reflect a light beam back in a direction close to an incidence direction thereof. The first reflecting unit 14 and the second reflecting unit 15 are respectively a stripped retroreflector. The signal processing unit 16 has an image processing function, respectively electrically connected to the light detecting unit 12 and the microprocessor 17.

The light detecting unit 12 is positioned above or below the light emitting module 11. The mixed-type reflecting unit 13, the first reflecting unit 14 and the second reflecting unit 15 are surrounded to form a approximately rectangular work area 20, where the first reflecting unit 14 and the second reflecting unit 15 are respectively positioned at the two side ends of the mixed-type reflecting unit 13. The contact of the first reflecting unit 14 and the second reflecting unit 15 is a corner of the work area 20 and is set to be a reference point 0. The work area 20 may be a touch area of a touch control device.

The light emitting module 11 is positioned exactly below or above and close to the reference point 0, the mixed-type reflecting unit 13 is positioned oppositely to the light emitting module 11, and the first reflecting unit 14 and the second reflecting unit 15 are respectively positioned at the two sides of the light emitting module 11. The double of the length from the reference point O to one side end of the mixed-type reflecting unit 13 is set to be a length D1 and to another side end of the mixed-type reflecting unit 13 is set to be a length D2. Namely, the length D1 is the double length of the first reflecting unit 14, and the length D2 is the double length of the second reflecting unit 15.

Figure 2:
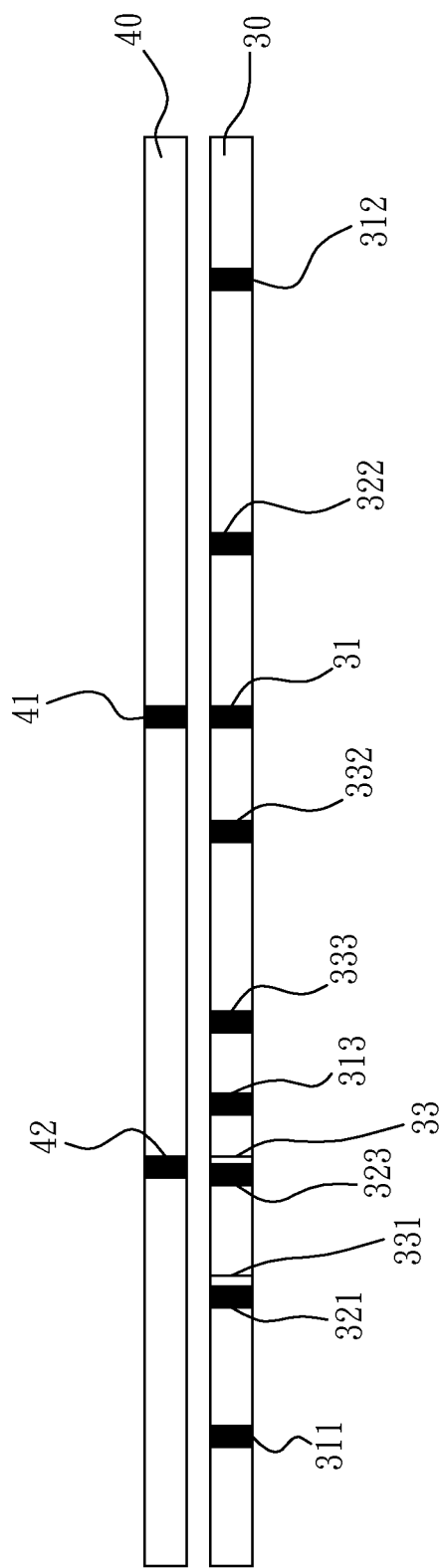
FIG. 2 is a schematic view of a first signal and a second signal according to the present invention.

Referring to FIGS. 1, 2 and 5, the light of the light emitting module 11 projected on the work area 20 can be reflected by the mixed-type reflecting unit 13 to the light detecting unit 12. Since the mixed-type reflecting unit 13 is a long strip and has the reflecting mirror 131 and retroreflector 132 arranged stacking vertically, the light detecting unit 12 will detect a stripped first signal (image) 30 and second signal (image) 40 respectively corresponding to the reflecting mirror 131 and the retroreflector 132. The first signal 30 and the second signal 40 are all in a stronger (brighter) state while no object in the work area 20 blocks the light projected on the work area 20.

Referring to FIGS. 1, 2 and 5, if objects P1, P2 and P3 are located on the work area 20 simultaneously, and the objet P1, the object P2 and the light beam emitting module 11 are on the same line; a light beam L11 emitted from the light emitting module 11 is projected on the object P1 and then blocked by the object P1 from projecting on the object P2 directly The light beam L11 and a light beam L31 of the light emitting module 11 projected on the work area will be blocked directly by the object P1 and the object P3 from projecting on the reflecting mirror 131 and the retroreflector 132. As a result, first weak signals (dark spots) 31, 33 respectively corresponding to the object P1 and the object P3 are formed on the first signal 30, and second weak signals (dark spots) 41, 42 respectively corresponding to the object P1 and the object P3 are formed on the second signal 40.

The object P1 may also block indirectly light beams L12, L13 and L14 of the light emitting module 11 projected on the work area 20 and then reflected by the reflecting mirror 131, forming first weak signals 311, 312 and 313 corresponding to the object P1 on the first signal 30. Since the reflecting mirror 131 shapes an "L", to each object blocking a light beam indirectly, weak signals corresponding to a primary reflection acted by the reflecting mirror 131, for example, the first weak signals 311, 312, and a secondary reflection acted by the reflecting mirror 131, for example, the first weak signal 313, will be obtained. Similarly, the object P2 may also block indirectly light beams L21, L22 and L23 of the light emitting module 11 projected on the work area 20 and then reflected by the reflecting mirror 131, forming first weak signals 321, 322 and 323 corresponding to the object P2 on the first signal 30. Furthermore, the object P3, similarly, may also block indirectly light beams L32, L33 and L34 of the light emitting module 11 projected on the work area 20 and then reflected by the reflecting mirror 131, forming first weak signals 331, 332 and 333 corresponding to the object P3 on the first signal 30.

Referring to FIGS. 1 and 2 again, the ranges of the first signal 30 and the second signal 40 correspond respectively to the angle ranged from 0 to 90 degrees, or the time intervals of the appearances of the first signal 30 and the second signal 40 correspond respectively to the angle ranged from 0 to 90 degrees. As a result, the positions and the appearance time of the first weak signals and the second weak signals respectively in the first signal 30 and the second signal 40 are respectively analyzed and processed through the signal processing unit 16, and the included angles between the light beams of the light emitting module 11 emitted from the reference point O and then blocked directly or indirectly by the objects P1, P2 and P3 and the first reflecting unit 14, and the included angles between these light beams and the second reflecting unit 15 can be obtained.

Therefore, included angles A11 and A12 formed by respectively intersecting the light beams of the light emitting module 11 emitted from the reference point O and then blocked directly by the objects P1, P2 and P3 with the first reflecting unit 14 and the second reflecting unit 15 can be obtained from the first signal 30; included angles A21 and A22 formed by respectively intersecting the light beams of the light emitting module 11 emitted from the reference point O and then blocked directly by the objects P1, P2 and P3 with the first reflecting unit 14 and the second reflecting unit 15 can be obtained from the second signal 40; and included angles A13 and A14 formed by respectively intersecting the light beams of the light emitting module 11 emitted from the reference point O and then blocked indirectly by the objects P1, P2 and P3 with the first reflecting unit 14 and the second reflecting unit 15 can be obtained from the first signal 30. The angles A11 and A12 are equal respectively to the angles A21 and A22.

Referring to FIG. 1 again, a relative coordinate of the object P1 on the work area 20 can be calculated by means of the trigonometric formula disclosed in the U.S. Patent mentioned above from the included angle A21 between the light beam L11 and the first reflecting unit 14, the included angle A13 between the light beam L12, and the first reflecting unit 14 and the length D1 that is double the length of the first reflecting unit 14. In addition, the relative coordinate of the object P1 on the work area 20 can also be calculated by means of the trigonometric formula disclosed in the U.S. Patent mentioned above from the included angle A22 between the light beam L11 and the second reflecting unit 15, the included angle A14 between the light beam L13 and the second reflecting unit 15 and the length D2 that is double the length of the second reflecting unit 15.

Relative coordinates of the objects P2, P3 may also be obtained through the same calculation mentioned above, and each body P1, P2, P3 may obtain three similar corresponding relative coordinates. Therefore, each included angle A21 and A22 formed by respectively intersecting the light beam of the light emitting module 11 emitted from the reference point O and blocked directly by the object with the first reflecting unit 14 and the second reflecting unit 15 obtained from the second signal 40 are respectively combined with the corresponding lengths D1 and D2, and then combined with each included angle A11, A12, A13 and A14 formed by respectively intersecting the light beam of the light emitting module 11 emitted from the reference point O and blocked directly and indirectly by the object with the first reflecting unit 14 and the second reflecting unit 15 obtained from the first signal 30 to obtain a plurality of coordinates through the conversion of the trigonometric formula disclosed in the U.S. Patent mentioned above, and the plurality of coordinates are then compared with one another, selecting at least two coordinates with the same value among the plurality of coordinates, thereby confirming a relative coordinates of the bodies on the work area 20 by means of the microprocessor 17.

Although the object P1 blocks the light beam L11 emitted from the light emitting module 11 from projecting on the object P2 directly, and included angles formed by respectively intersecting a line beam emitted from the light emitting module 11 and blocked directly by the object P2 with the first reflecting unit 14 and the second reflecting unit 15 cannot be obtained while the objects P1, P2 and the light emitting module 11 are positioned on the same line, but the present invention can still detect the coordinate of the object P2, which cannot be detected through the Taiwan patent and the U.S. Patent mentioned above.

Figure 3:
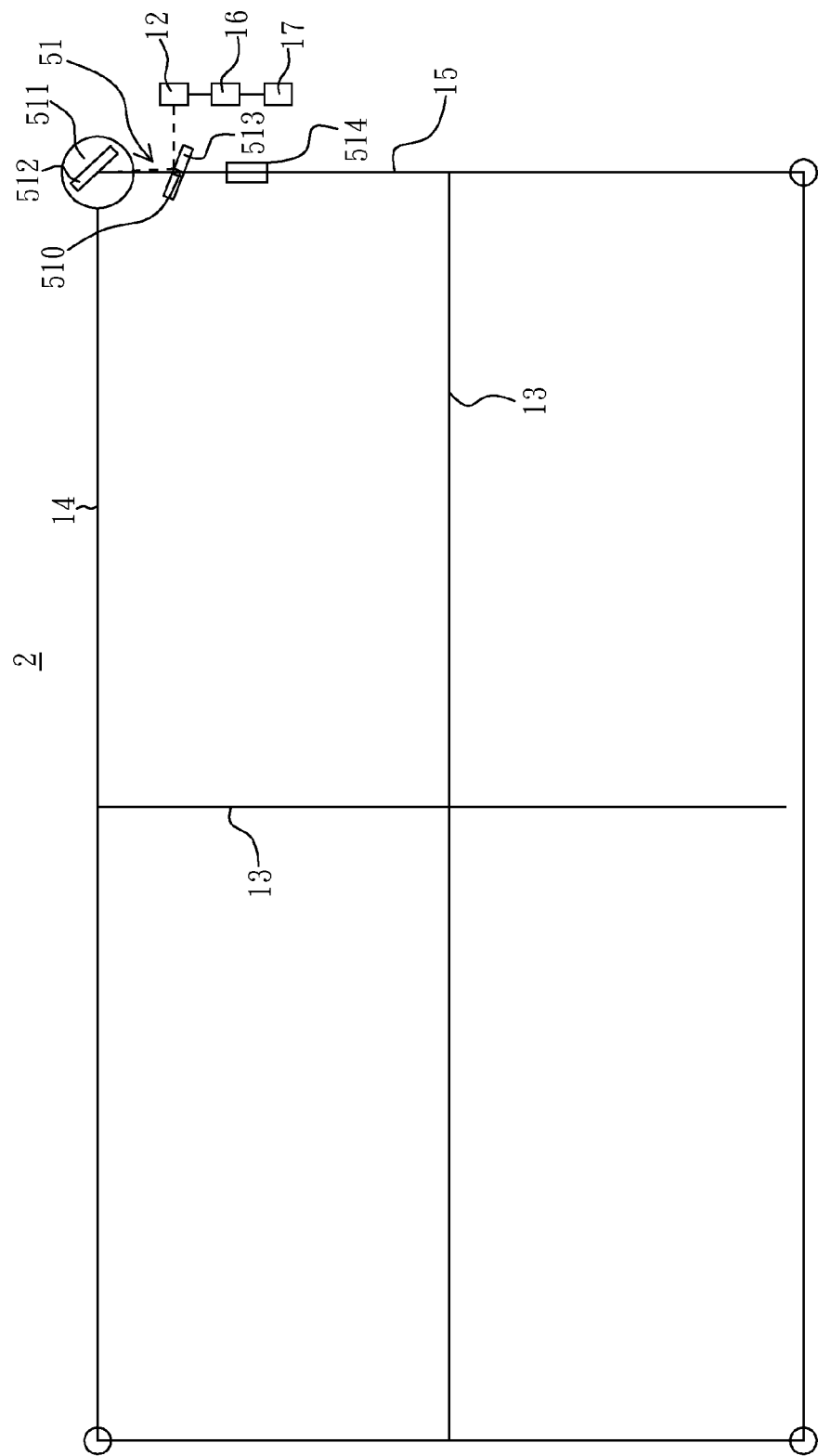
FIG. 3 is a schematic view of an object position determining device of a second preferred embodiment according to the present invention.

Referring to FIG. 3, an object position determining device 2 of a second preferred embodiment according to the present invention includes a light emitting module 51, a light detecting unit 12, a mixed-type reflecting unit 13, a first reflecting unit 14, a second reflecting unit 15, a signal processing unit 16 and a microprocessor 17; other structures and the coordinate calculating method are almost the same as those disclosed in the first embodiment except a light emitting module structure and the position of the light detecting unit; the same description is omitted here.

The light emitting module 51 of the present embodiment includes a scanning mechanism 511, a scanning mirror 512, a reflecting mirror with a through hole 510 or semi-reflecting mirror 513 and a light source 514. A light beam emitted from the light source 514 passes through the through hole 510 of the reflecting mirror or semi-reflecting mirror 513 to the scanning mirror 512, and then is reflected to the work area 20 by the scanning mirror 512 at the reference point O; the scanning mechanism 511 drives the scanning mirror 512 to scan the whole work area 20 quickly; it is the same as LED light or laser light is used to illuminate the whole work area in the first embodiment. Next, the light beam reflected from the mixed-type reflecting unit 13, the first reflecting unit 14 and the second reflecting unit 15 is reflected to the semi-reflecting mirror 513, and then reflected to the light detecting unit 12 by the reflecting mirror or the semi-reflecting mirror 513. The light source 514 is a LED light source or laser light source.

As disclosed in the first embodiment mentioned above, each included angle formed by respectively intersecting the light beam emitted from the light emitting module and blocked directly by the object with the first reflecting unit and the second reflecting unit obtained from the second signal are respectively combined with the corresponding lengths D1 and D2, and then combined with each included angle formed by respectively intersecting the light beam of the light emitting module emitted from the light emitting module and blocked directly and indirectly by the objects with the first reflecting unit and the second reflecting unit obtained from the first signal to obtain a plurality of coordinates, and the plurality of coordinates are then compared with one another, selecting at least two coordinates with the same value among the plurality of coordinates, thereby confirming the coordinates of the bodies on the work area by means of the conversion of the microprocessor in the present embodiment.

Figure 4:
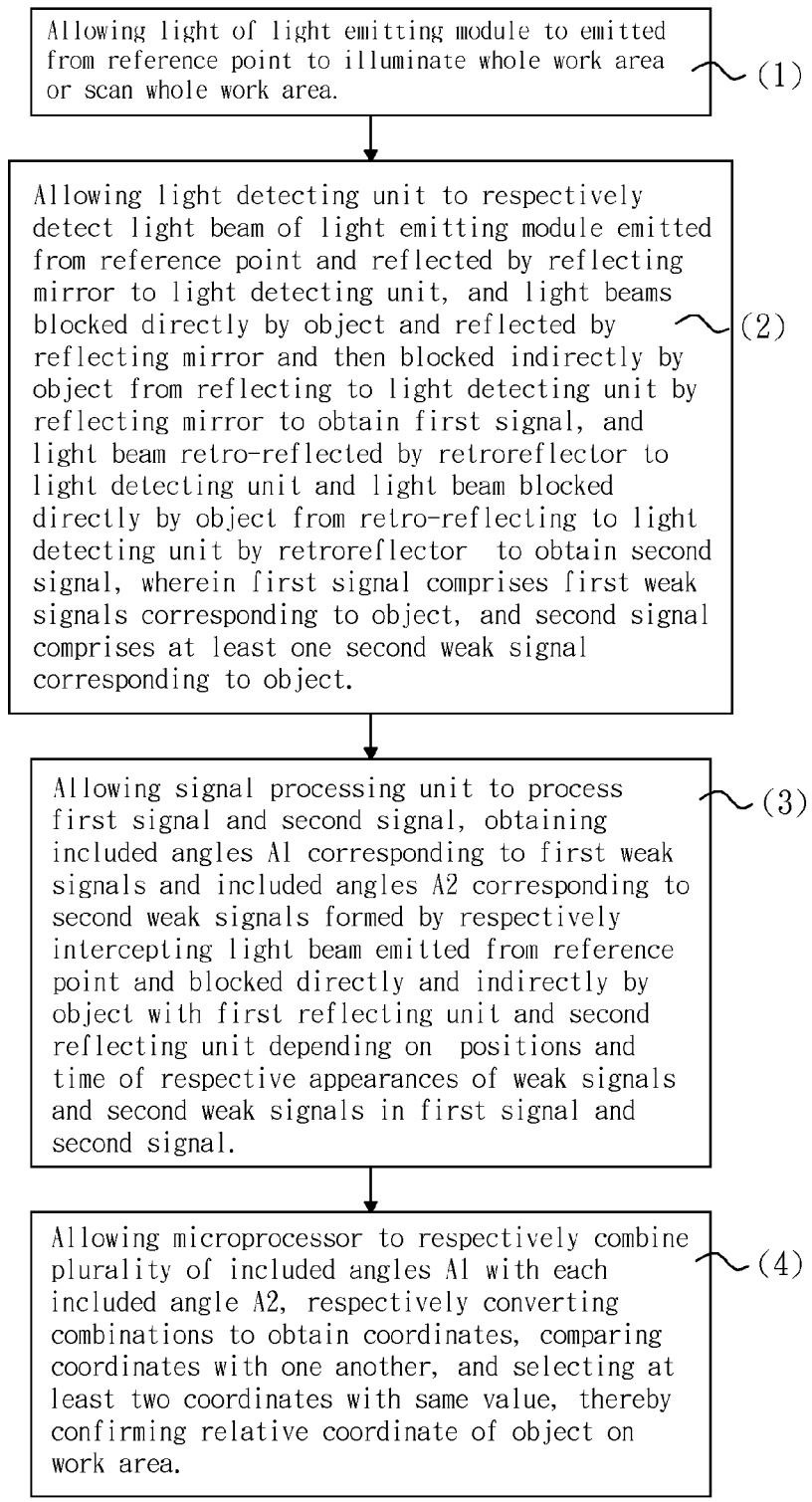
FIG. 4 is a flow chart of an object position determining method according to the present invention.

Referring to FIG. 4, a method for determining the position of an object is used to detect the coordinate of an object on a work area, where the work area is surrounded by a stripped L-shaped mixed-type reflecting unit and stripped first and second reflecting units. The first reflecting unit and the second reflecting unit are respectively positioned at the two side ends of the mixed-type reflecting unit, and a contact of the first reflecting unit and the second reflecting unit is a corner of the work area that is set to be a reference point. Furthermore, the mixed-type reflecting unit includes a reflecting mirror and a retroreflector, where the retroreflector is positioned above or below the reflecting mirror. The method for determining a position of an object includes the following steps:

(1) emitting a light beam emitted from a light emitting module at the reference point to illuminate the whole work area or scanning the whole work area;

(2) respectively detecting the light beam emitted from the light emitting module at the reference point and then reflected by a reflecting mirror to a light detecting unit, the light beams blocked directly by an object, and reflected by the reflecting mirror and then blocked indirectly by the objects from reflecting to the light detecting unit by the reflecting mirror to obtain a first signal, and the light beam retro-reflected by a retroreflector to the light detecting unit, and the light beams blocked directly from retro-reflecting to the light detecting unit by the retroreflector to obtain a second signal through the light detecting unit, where the first signal includes a plurality of first weak signals corresponding to the objects, and the second signal includes at least one second weak signal corresponding to the object;

(3) processing the first signal and the second signal through a signal processing unit, obtaining a plurality of included angles A1 corresponding to the first weak signals and a plurality of included angles A2 corresponding to the second weak signals by respectively intercepting the light beams emitted from the reference point and then blocked directly and indirectly by the objects with the first reflecting unit and the second reflecting unit depending on the positions or time at which the first weak signals and the second weak signals respectively appear in the first signal and in the second signal;

(4) respectively combining the plurality of included angles A1 with each included angle A2, and respectively converting the combinations to obtain a plurality of coordinates through a microprocessor; and then comparing the plurality of coordinates with one another, selecting at least two coordinates with the same value among the plurality of coordinates, thereby confirming a relative coordinate of the object on the work area.

A method for determining the position of an object according to the present invention includes the technical contents disclosed in an object position determining device mentioned above, the details concerned are omitted here.

A device and method for determining a position of the object allows a work area to be surrounded by a stripped L-shaped mixed-type reflecting unit and stripped first and second reflecting units, where the mixed-type reflecting unit includes a reflecting mirror and a retroreflector. A plurality of included angles A1 formed by respectively intercepting a light beam blocked directly and indirectly by an object with the first reflecting unit and the second reflecting unit can be detected through the reflecting mirror, and a plurality of included angles A2 formed by respectively intercepting the light beam blocked directly by the object with the first reflecting unit and the second reflecting unit can be detected through the retroreflector. The plurality of included angles A1 are respectively combined with each included angle A2, and the combinations are then respectively converted to obtain a plurality of coordinates. Finally, the plurality of coordinates are compared with one another to select the two coordinates with the same value among the plurality of coordinates. Thereby conforming a relative coordinate on the work area. As a result, the positions of the plurality of objects can be determined simultaneously, multi-touch can be carried out conveniently, and the coordinate of a blocked object can be determined.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A position determining device for objects, comprising:
   a light emitting module;
   a first reflecting unit, being a long strip;
   a second reflecting unit, being a long strip;
   a mixed-type reflecting unit, comprising a stripped L-shaped reflecting mirror and a stripped retroreflector, said retroreflector being positioned above or below said reflecting mirror; wherein an approximately rectangular work area is formed to be surrounded by said mixed-type reflecting unit, said first reflecting unit and said second reflecting unit, said first and second reflecting units are respectively positioned at two side ends of said mixed-type reflecting unit, a contact of said first and second reflecting units is a corner of said work area being set as a reference point, a light beam of said light emitting module is emitted from said reference point to illuminate or scan said work area entirely;
   a light detecting unit, detecting a plurality of objects directly and indirectly blocking said light beam via said reflecting mirror to obtain a first signal respectively, and detecting said objects directly blocking said light beam via said retroreflector to obtain a second signal respectively, wherein said first signal comprises a plurality of first weak signals corresponding to said objects and said second signal comprises at least one second weak signal corresponding to said objects;
   a signal processing unit, electrically connected to said light detecting unit, processing said first signal and said second signal to obtain a plurality of included angles (A1) corresponding to said first weak signals and a plurality of included angles (A2) corresponding to said second weak signals, wherein the included angles (A1) and (A2) are formed by said blocked light beam intersecting the first reflection unit and the second reflection unit respectively;
   a microprocessor, electrically connected to said signal processing unit, arranging said included angles (A1) with each of said included angles (A2), respectively as a plurality of combinations of included angles, converting said combinations to a plurality of coordinates, comparing said coordinates with one another, selecting at least two of said coordinates with the same value among said coordinates, and confirming corresponding coordinates of said objects on said work area.

2. The device according to claim 1, wherein said light emitting module is positioned exactly above or below said reference point and close to said reference point, said light emitting modules comprises a light emitting diode (LED) light source or laser light source, and said light detecting unit is positioned above or below said light emitting module.

3. The device according to claim 2, wherein said light detecting unit is a camera.

4. The device according to claim 1, wherein said light emitting module comprises a scanning mechanism, a scanning mirror, a reflecting mirror with a through hole or semi-reflecting mirror, and an LED light source or laser light source, a light beam emitted from said light source passes through said reflecting mirror with a through hole or semi-reflecting mirror to said scanning mirror, reflected by said scanning mirror at said reference point to said work area, said scanning mechanism drives said scanning mirror to scan said whole work area, said light beam is reflected by said mixed-type scanning mirror to said reflecting mirror or said semi-reflecting mirror, and then reflected by said reflecting mirror or said semi-reflecting mirror to said light detecting unit.

5. The device according to claim 1, wherein said first reflecting unit and said second reflecting unit respectively are a stripped retroreflector, and said work area is a touch area.

6. The device according to claim 2, wherein said first reflecting unit and said second reflecting unit respectively are a stripped retroreflector, and said work area is a touch area.

7. The device according to claim 3, wherein said first reflecting unit and said second reflecting unit respectively are a stripped retroreflector, and said work area is a touch area.

8. The device according to claim 4, wherein said first reflecting unit and said second reflecting unit respectively are a stripped retroreflector, and said work area is a touch area.

9. A position determining method for objects, comprising following steps:
   (a) emitting light beam of a light emitting module from a reference point to illuminate or scan a work area entirely;
   (b) detecting a plurality of objects directly and indirectly blocking said light beam with a light detecting unit when the light beam is reflected by a reflecting mirror to said light detecting unit so as to obtain a first signal, and detecting said objects directly blocking said light beam with said light detecting unit when the light beam is retro-reflected by a retroreflector to said light detecting unit so as to obtain a second signal, wherein said first signal comprises a plurality of first weak signals corresponding to said objects and said second signal comprises at least one second weak signal corresponding to said objects;
   (c) processing said first signal and said second signal with a signal processing unit to obtain a plurality of included angles (A1) corresponding to said first weak signals according to where or when the first weak signals appear in the first signal and a plurality of included angles (A2) corresponding to said second weak signals according to where or when the second weak signals appear in the second signal, wherein the included angles (A1) and (A2) are formed by said blocked light beam intersecting with said first reflecting unit and said second reflecting unit respectively;
   (d) providing a microprocessor to arrange said included angles (A1) with each of said included angles (A2), respectively as a plurality of combinations of included angles, to convert said combinations to a plurality of coordinates, to compare said coordinates with one another, to select at least two coordinates with the same value, and to confirm corresponding coordinates of said object on said work area;
   wherein said work area is surrounded by a stripped L-shaped mixed-type reflecting unit, a stripped first reflecting unit and a stripped second reflecting unit, said first and second reflecting units are respectively positioned at two side ends of said mixed-type reflecting unit, a contact of said first reflecting unit and said second reflecting unit being a corner of said work area to be set as a reference point, said mixed-type reflecting unit comprising a reflecting mirror and a retroreflector, and said retroreflector being positioned above or below said reflecting mirror.

10. The method according to claim 9, wherein said light emitting module is positioned exactly above or below said reference point and close to said reference point, said light emitting modules comprises a light emitting diode (LED) light source or laser light source, and said light detecting unit is positioned above or below said light emitting module.

11. The method according to claim 10, wherein said light detecting unit is a camera.

12. The method according to claim 9, wherein said light emitting module comprises a scanning mechanism, a scanning mirror, a reflecting mirror with a through hole or semi-reflecting mirror, and an LED light source or laser light source, a light beam emitted from said light source passes through said reflecting mirror with a through hole or semi-reflecting mirror to said scanning mirror, reflected by said scanning mirror at said reference point to said work area, said scanning mechanism drives said scanning mirror to scan said whole work area, said light beam is reflected by said mixed-type scanning mirror to said reflecting mirror or said semi-reflecting mirror, and then reflected by said reflecting mirror or said semi-reflecting mirror to said light detecting unit.

13. The method according to claim 9, wherein said first reflecting unit and said second reflecting unit respectively are a stripped retroreflector, and said work area is a touch area.

14. The method according to claim 10, wherein said first reflecting unit and said second reflecting unit respectively are a stripped retroreflector, and said work area is a touch area.

15. The method according to claim 11, wherein said first reflecting unit and said second reflecting unit respectively are a stripped retroreflector, and said work area is a touch area.

16. The method according to claim 12, wherein said first reflecting unit and said second reflecting unit respectively are a stripped retroreflector, and said work area is a touch area.

* * * * *